(12) United States Patent
Tyrrell

(10) Patent No.: US 10,467,506 B2
(45) Date of Patent: Nov. 5, 2019

(54) CARDZI DISPLAY SYSTEM

(71) Applicant: Christopher B. Tyrrell, Wentzville, MO (US)

(72) Inventor: Christopher B. Tyrrell, Wentzville, MO (US)

( * ) Notice: Subject to any disclaimer, the term of this patent is extended or adjusted under 35 U.S.C. 154(b) by 222 days.

(21) Appl. No.: 15/703,531

(22) Filed: Sep. 13, 2017

(65) Prior Publication Data

US 2018/0075321 A1 Mar. 15, 2018

Related U.S. Application Data

(60) Provisional application No. 62/394,051, filed on Sep. 13, 2016.

(51) Int. Cl.
| | |
|---|---|
| G06K 9/62 | (2006.01) |
| G06T 7/11 | (2017.01) |
| G06F 3/0482 | (2013.01) |
| H04N 7/18 | (2006.01) |
| G06F 16/51 | (2019.01) |
| G06F 16/58 | (2019.01) |
| G06K 9/00 | (2006.01) |
| G06K 1/12 | (2006.01) |

(52) U.S. Cl.
CPC ......... *G06K 9/6267* (2013.01); *G06F 3/0482* (2013.01); *G06F 16/51* (2019.01); *G06F 16/5866* (2019.01); *G06K 9/00677* (2013.01); *G06K 9/6262* (2013.01); *G06T 7/11* (2017.01); *H04N 7/185* (2013.01); *G06K 1/121* (2013.01)

(58) Field of Classification Search
CPC ........ G06K 9/6267; G06K 9/00; G06K 1/121; G06F 16/5866; G06F 16/51; G06F 3/0482; H04N 7/185; G06T 7/11

USPC .......................................................... 382/224
See application file for complete search history.

(56) References Cited

U.S. PATENT DOCUMENTS

2018/0075321 A1* 3/2018 Tyrrell ................. G06K 9/6267

FOREIGN PATENT DOCUMENTS

WO WO-2016080250 A1 * 5/2016 ......... G06K 9/00288

OTHER PUBLICATIONS

Webpage, Greeting Card Capture, 2019 (Year: 2019).*

* cited by examiner

*Primary Examiner* — Amandeep Saini
(74) *Attorney, Agent, or Firm* — Charles McCloskey

(57) ABSTRACT

A cardzi display system has software and related hardware that collects images of cards owned by a user by gift or purchase, organizes and shares them. The system has a load screen, a bottom menu, a tutorial function, a log-in and registration screen, a feed, a library, a capture function, an invitation function, and a viewer. The bottom menu leads to the tutorial, the capture function, the library, the feed, and user profile. The log-in screen has a user register initially and later to enter the invention. The feed provides sharing, organizing, and searching of images, and comment capability. The library stores card images captured by a user's camera and then later displayed on the viewer. Upon seeing a cardzi, a user may have others to view it through the invitation function. The system may include a printer configured to print cardzis remotely.

7 Claims, 3 Drawing Sheets

CARDZI DISPLAY SYSTEM

CROSS-REFERENCE TO RELATED APPLICATION

This non-provisional application claims priority to pending provisional application No. 62/394,051 filed on Jun. 13, 2016 which is owned by the same inventor.

BACKGROUND OF THE INVENTION

The cardzi display system generally relates to software and more specifically to capturing, organizing, and retrieving photographs of cards.

For a few centuries, people have printed and sent cards to each other. The cards served as introductions, greetings, reminders of annual events such as birthdays, anniversaries, and holidays, and events of rarer occurrence. People grew accustomed to receiving cards. In time, artists decorated cards with various scenes, flowers, graphics, and the like. Writers composed various sentences, stanza, poems, and other forms of inspiration. In recent decades, cards have proliferated to follow the holidays and other events worth honoring and remembering. Select cards also play music, songs, and voices. Cards also have portions that move during the opening of a card and upon a reader moving a tab or an armature. Cards typically have a center fold and two panels flanking the fold. The obverse face of the card has the two interior panels seen by a recipient of a card and the reverse face of the card has the front panel seen upon retrieving a card from an envelope and the back panel typically showing the card's printer and universal product code among other information.

People though have a fondness for birthday cards, anniversary cards, other select annual events, and events that occur less often. Eventually such cards accumulate into various files and piles. A handful of persons retain cards that they receive for many, many years. At some estate sales, lengthy collections of cards remain after a person has gone. How to store and handle a growing collection of cards provides a storage matter to many people.

DESCRIPTION OF THE PRIOR ART

As cards accumulate, people store them in various ways. Some place the cards in an album, others in a file of a year's events, and others bundle the cards. Collections of cards reside in desk drawers, file cabinets, and storage boxes in various locations within a home. Collections of cards often have an organization by year of recipient and some have cards organized by event, such as Mother's Day or anniversary. Viewing of cards once more calls for a person to flip through them manually. A person may seek a specific card in a collection or may browse through a collection and view many cards while reminiscing as they enter the sight of a person.

From time to time a few people review the cards that they have received. Most people though rarely review a card after the event of its sending to them has passed. Seeing cards once more would allow people to remember past events and people.

Presently, more and more people utilize Smart phones and tablet style computers. These devices often have an onboard camera and various software platforms that organize photographs taken by that camera. Software platforms come and come as user preferences change over time. Google® developed the Picasa platform that now enters its sunset phase. Remaining photo software platforms utilize the meta data of each photograph and select pictorial elements, such as faces, to organize a collection of photographs with the least user effort. Present software platforms and select Smart phone operating systems allow a user to share photographs readily. A user shares a photograph when the user sends the photograph to another user upon email, instant message, text, SMS, and other communication systems. A user typically sends a photograph taken upon the user's device.

However, a collection of paper cards often grows while in storage. People rarely share their cards with others beyond the immediate family. To optimize storage and promote dissemination of a person's cards with others, a need exists for software and related hardware tailor to cards, including without limitation, greeting cards, birthday cards, anniversary cards, new job cards, retirement cards, new baby cards, and the like.

SUMMARY OF THE INVENTION

The cardzi display system provides software and related hardware that collects images of cards owned by a user whether by gift or purchase, organizes those images, and allows sharing of the images by the user with select other persons. The cardzi display system has software with a load screen, a bottom menu, a tutorial function, a log-in and registration screen, a feed, a library, a capture function, an invitation and sharing function, and a viewer. The bottom menu leads to the tutorial function, the capture function, the library, the feed, and user profile with feed being the default displayed frame upon a screen of a user's device. The tutorial provides an instructive video presentation of the other screens of this invention. The log-in screen allows a user to register initially with the invention and then to return to the invention when using it later. The feed provides sharing, organizing, and searching of images along with a comment capability and link into the invitation function. The library saves and stores images of cards captured by a user's camera upon a Smart phone or tablet computer. The capture function receives the images of a card and sorts and stores the panels of a card for display through the viewer. The viewer shows a digital form a user's card that a user may flip through upon a Smart phone or tablet similar to thumbing through cards manually in a collection. Upon seeing an attractive card, a user may invite others to view it through the invitation function.

The cardzi display system captures images of real cards and turns them into electronic cards, or E-cards, for sharing or for archiving. In this specification a saved virtual card goes by the name cardzi. The cardzi display system super imposes images of handwriting onto cards with a phone/tablet camera. This allows a user to you sign a white sheet of paper, take a picture of it, and then add it add it to a cardzi.

An alternate embodiment of the cardzi display system includes printer enabled hardware which prints cardzis anywhere in the world as real cards. This embodiment results in a printer using its own paper tray with card stock that prints both sides, folds a card in half, then dispenses the card from the printer like other printed documents. This alternate embodiment allows a user to buy any card anywhere in the world, take a picture of the user's signature, add it to the card, and then have it printed by any printer enabled for cardzis. A user may print his own card, again, in lieu of going to a store, or may print his card at the recipient's home via a mobile application where a recipient just walks to his printer and collects a paper card sent by the user. The present invention allows for printing of bar codes directly on a Cardzi as a gift card to a stores which also serves as a present. For those who procrastinate, on the day of anyone's birthday, a last minute user may buy a cardzi, print it to the home of a recipient with a gift card, and the user never has to leave his own home and perhaps even his desk, bed, or other favorite computing location.

An alternate embodiment of the invention allows for the design and sale of independent cards not affiliated with a major card supplier through a cardzi market. The invention allows anyone, anywhere to design their own cards. Designers of cards then receive remuneration for their talents upon the purchase or printing of a cardzi with their design.

Another alternate embodiment of the invention includes a software application that displays cardzis upon a television. For example, at a birthday party, a television with a cardzi application of the invention, appears on in the background of the party. The birthday girl or boy, or recipient of cards for any reason, can view them on the television. Thus, this embodiment saves paper, printing, and mailing costs. The user then saves the cardzis from the television to their computer or cloud account for archiving or sharing on social media.

The present invention backs up user owned greeting cards digitally. In case, such as from fire, theft, flood, and the like, the invention will store cards as virtual three dimensional flip-able cards. The invention will also generate revenue by sharing captured cards over social media platforms for the purpose of advertising for the card, its designer, and its copyright owner. Advertising customers provide the funding to operate the invention, thus the invention operates free of charge to its users, card designers, and copyright owners. Though Pinterest® and Google® Image have huge sources of internet redirects, the present invention seeks no money and claims no ownership and no publishing of captured cards. Cards must be the owned property of the user, and the user comprehends that cardzis can be taken down from the cardzi system if requested by a copyright owner. The backup portion of the invention will remain as anyone has the right to backup images of the cards purchased or cards received as gifts.

The invention generates its revenue selling new cards, and advertising for other mobile applications. Unlike existing e-card applications to date, the invention captures images of real cards and lets users share them.

As mentioned above, an alternate embodiment of the invention includes the ability to write and sign a white sheet of paper, and then the invention will overlay that upon a real captured card. This embodiment brushes against the publishing industry but will be an embodiment that will require card manufacturer's permission, or original cards coordinated through the owner of this invention. Users may purchase captured cards from a manufacturer such a Hallmark for example, where Hallmark has captured its paper card, then the user signs "Happy Birthday! Love, Adam," for example, on a white sheet of paper. The invention, utilizing a user's smart phone camera, captures a handwritten note or signature and overlays it onto the card. A card vendor sets the price for its captured card, with a percentage of that price accruing to the owner of the invention. The captured card can then be shared over the Cardzi or present invention, social media, or text, or email.

As above, another embodiment has hardware that prints cards at home. Such printers will have a notation "cardzi" invention enabled. Those printers will have a dedicated paper tray that holds "cardzi" print stock, will print on both sides of stock, scored centrally for easy folding, and will mechanically fold a printed cardzi at the end of print cycle.

In this embodiment, cardzi enabled printers can print cards at home wherever that may be. Again with permission from card manufacturers, a user can shop cards in the invention, sign blank paper, superimpose a handwritten note onto a captured card, and then print that cardzi to any card again enabled printer. A user at home could shop and print cards. A user of the invention could also send cards to people if they also have a cardzi enabled printer. Last minute cards will fade away as an issue. A user may prepay, sign, and store a card again captured card from manufacturer. The user may then have the cardzi sent to his printer on a specific holiday or birthday of another person. The printer will have diagnostics to know if there is an issue, paper jam, low ink, network connection error, software glitch, and the like. Upon detection of an issue, the invention then allows a user to share a card with that recipient via email, or social network such as Facebook® for example. The recipient can then view the card in the cardzi app, or optionally print it when their printer error clears and at any time in the future. In this embodiment, a card manufacturer would receive its set price for the card, and the owner of the cardzi application would receive a percentage agreed to by the card manufacturer.

The present invention will also have the ability to recognize shared cards between its users. In this feature, when a user shares cards online via email or a social network, and a viewer likes the card, the viewer may then "heart" or "like" the card and even buy the card right then and there if the manufacturer of that card has agreed to this service. The card then undergoes processing for its purchase through cardzi software of the present invention. A card may be mailed to a user via U.S. Postal Service for paper cards, or optionally, be printed via a Cardzi enabled printer. For a smaller fee, it can simply be sent as a captured virtual card across the Cardzi system, with super imposed Cardzi proprietary capture method of hand written notes as previously described. All payment will be through the Cardzi software of the present invention, linked PayPal® account or other pay service to include credit card information stored in a user's Cardzi profile, or crypto currency such as bitcoin or ETH.

The Cardzi software of the present invention will also appear within the smart television application market. So that on holidays or birthdays, all received Cardzi cards may appear on smart televisions which have the Cardzi present invention installed. The present invention can also install upon video game consoles such as Playstation® 4, Xbox® 1, the latest Nintendo® console, or other TV application devices like Ruku®, Chrome® TV, or Apple® TV.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a cardzi display system that captures images of cards owned or received by a user.

Another object is to provide such a cardzi display system that organizes images of cards for prompt retrieval.

Another object is to provide such a cardzi display system that allows users of the system to share images of cards between themselves.

Another object is to provide such a cardzi display system that allows users to mail paper cards, email, text, and send electronic cards to other non-users and between fellow users.

Another object is to provide such a cardzi display system that has advertising tastefully positioned upon the viewer of the system and funded by the advertisers.

Another object is to provide such a cardzi display system that installs upon a printer for printing of cards upon cardstock.

Another object is to provide such a cardzi display system that is capable of manufacturing and distribution at a price suitable for the users, app distributors, supply houses, retailers, and catalogs to provide.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
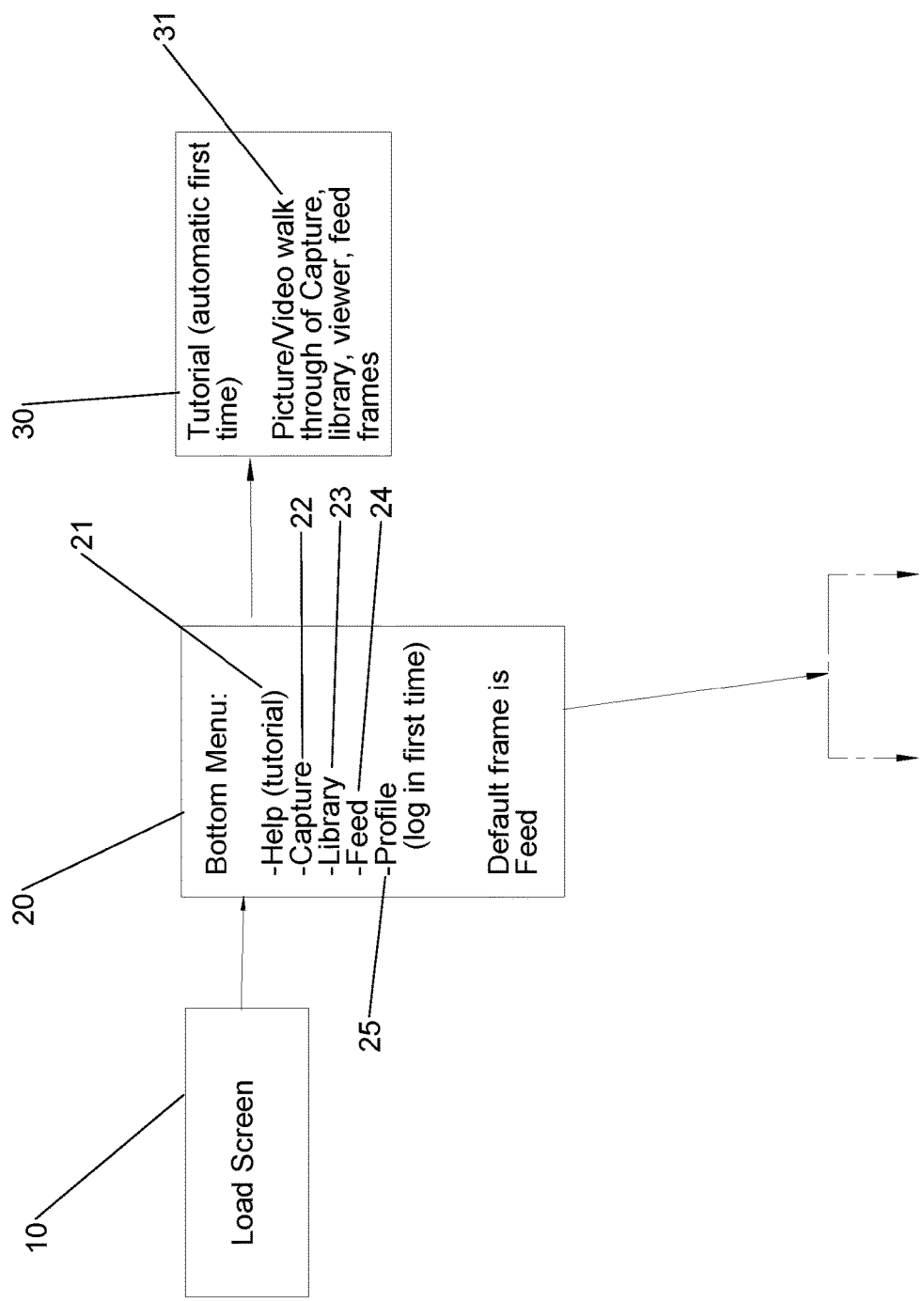
FIG. 1 shows a partial flow chart of the invention.

The present invention overcomes the prior art limitations by providing an electrical conductor to optical input conversion system. FIG. 1 shows a partial flow chart of the invention with the opening screens. Load screen 10 automatically displays upon launch of the invention while it loads. Then the load screen leads to the Main Menu screen 20. The main menu has a feed with a lower bar that has links to the following screens: help 21, capture 22, library 23, feed 24, and profile 25. The help screen provides tutorial functions, as at 30, through text and video, as at 31, to assist users with capture, library, viewer, and feed.

Figure 2:
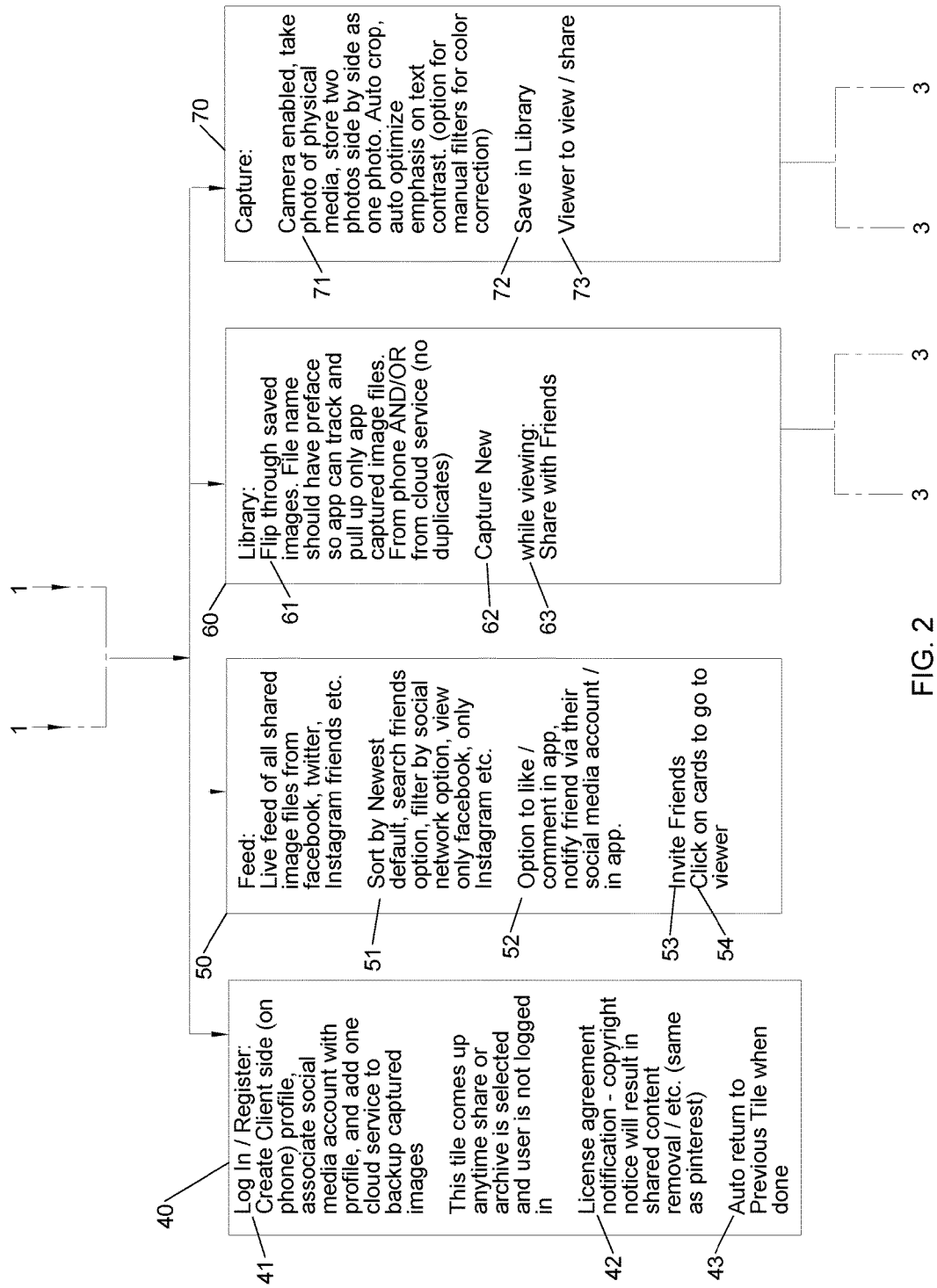
FIG. 2 shows a partial flow chart of the invention linking back to a portion of FIG. 1; and, FIG. 3 shows a partial flow chart of the invention linking back to a portion of FIG. 2.

During a first time load of the invention, the load screen 10 appears upon power up and directs the user to the help screen 21. Upon the help screen, the user then receives direction through a log in screen 40 to register 41 for the invention as in FIG. 2. The login screen 40 also displays a license agreement 42 between the user and the operator of the invention. During registration, the user provides basic information for the user's Cardzi profile or import such information from a social media platform, e.g. Facebook®. Upon completing registration, a user may then access other frames such as a user profile, other friends' profile pages, the cardzi viewer, and the share card. Upon a user registering or otherwise finishing with the log in screen, the invention returns the user to a previous screen as at 43.

On later loads of the invention, the load screen 10 appears on power up as before but the invention then displays the feed 24 with its menu bar. Upon the feed, the invention displays to the user lists of friends' cardzis following their individual profile picture message, time, date. The invention considers a user as his own friend so the cardzis of a user appear here as well. The feed also displays a shared image as later described in the capture section. The feed then also includes reminders of upcoming birthdays of friends and holidays of favorite friends.

Upon a user clicking his profile picture, the invention displays the profile of the user and provides a link to return 43 to the feed. Upon a user clicking a cardzi image, the invention displays a full cardzi in the viewer. The feed has a scroll bar generally upon the right of the screen and the scroll bar remains hidden unless during usage. The feed includes a plurality of links typically displayed upon the bottom of a screen. When a user clicks upon any of the plurality of links, the invention transitions to the target of the link and displays that later screen.

Turning to the log in function 40, at first usage of the invention, the invention prompts the user to sign up, or register 41 with the invention. The invention then requests that the user create a user name and password. The invention checks for duplication of the user name and only permits a new name different from any stored previous name. The invention checks for password integrity, that is, at least eight characters long, one capitalized letter, one numeral, and one non-alphanumeric character. The invention requests the user's email address and mailing address. The invention stores user data upon a backend server. The registration also provides the function for a user to import data from a social media platform, such as Facebook®. The invention includes a password retrieval function that allows a user to request a hint to his password or to force a reset of the password associated with a user name.

Following creation of a username and password, the log in function 41 directs the user to complete his profile. The profile requests information of the user such as photograph, first name, last name, birthday, check list of favorite holidays, astrological sign, among other things. This profile information appears in the feeds of select other users called friends. The information displays to a friend in the form of a message such as "firstname lastname's favorite holiday, favholiday, is coming up soon, would you like to shop favholiday cards?" with a link to shop for cards related to that holiday.

The profile creation function also provides the user the ability to link 51 to a social media platform, such as Facebook®, Instagram®, Twitter®, and the like, to add the user's friends, as at 53, from those platforms and their one click share cardzis. As above, the log in and profile information of a user resides upon a back end server in a secure environment. Before a user exits from the profile screen 25, the invention displays a user license agreement 42 and requires user acceptance of the agreement before enabling the sharing function of the invention. The user license agreement covers removal of material subject to a registered copyright upon request by the holder of the copyright registration. The profile information also allows a user to add a service to back up cardzis, such services include cloud serve, Google® drive, Microsoft® one drive, Dropbox®, iDrive, and the like. The backup creates a MyCardzi folder in the backup such as the cloud drive, and then saves five pictures to a drive in a folder for each full cardzi. While in the cardzi application, the invention, linked to a MyCardzi folder, a user may synchronize between the backup and a user's device, such as a smartphone, computer, or other portable electronic device. The synchronization downloads cardzis within the backup but not detected upon the user's device. The synchronization also uploads all of the cardzis upon the user's device not detected upon the backup. The synchronization occurs as part of the purchase function as later explained.

The registration function and profile information allow a user to add a picture of himself or something else to the profile. The profile picture then appears to other friends when the user participates with the invention. The profile picture remains stored with the other profile information upon a back end server. The picture appears in the view profile page. Having entered information into a user profile, perhaps a picture as well, the invention returns the user as at 43, who has logged in, to the feed screen 50 for the user to select the next task.

The present invention allows users to see as at 54, to review, and to buy separately taken images of a card, called a cardzi. A cardzi begins with a capture function 70. The capture function cycles through four photographs typically associated with a folded card 71. The cycle of photographs includes a capture 62 of an image of a card and the capture function 70 collects front of a card, capture inside left of a card, capture inside right, and capture back. The four photographs then have an association in the invention as a captured card, or cardzi, that a user may pull up in his MyCardzis folder. The MyCardzis folder allows a user to share the cardzi with other friends as at 63 typically with a swipe stroke upon the screen of the user's portable electronic device. The user swipes upon the cardzi to skip to another photograph, to enlarge one photograph, and to advance to the next cardzi, and the like. The present invention recognizes that select cards, such as postcards and Christmas cards for example, may only have front and back, thus the inside left and inside right photographs do not display and a user skips them with a swipe upon the cardzi image. The help tutorial as at 31 shows the swiping of the four photographs and also that cropping of an photograph removes all material outside the prepositioned four corners in a capture frame. The capture function also includes an optimization cycle that edits or emphasizes text, filters, manual editing, and addition of notes, among other things. These functions appeared in the purchase operation as later explained below.

The present invention saves various information in its database upon a backend server as at 72. That information includes the profile information from above and more particularly user name of a cardzi, time and date of capture of a cardzi, if applicable a tagged friend associated with the cardzi, notification status to a social media platform, type of card from a checklist—such as birthday, holiday, and the like, images saved of a cardzi—such as front, inside left, inside right, back, and shared. The four images appeared capture in the steps, capture front, capture inside left, capture inside right, and capture back of a card as at 70. While sharing takes place by the invention linking users and cardzis as at 63, 73.

The invention displays a shared image 73 in a viewer as half front, half inside right, and with both added side by side into a landscape orientation photo as the default appearance on the user's portable electronic device. If the cardzi only has front and back captured images, the invention displays those two images in landscape orientation and side by side. If the two capture images themselves have a landscape orientation, the invention displays them one above the other with the front above the inside right. If the two capture images include front and the back, the invention displays them front above the back. Shared cardzis appear in the feed 50 and library 60 functions of the invention. The sharing of the present invention links to social media platforms upon the user sharing an sms text or email with such platforms. For example, once a user clicks upon an image in a feed or library of the invention, the invention displays a cardzi to the user in the viewer. The viewer shows the front, inside left, inside right, and back if the best resolution of the user's device as a three dimensional flappable card.

Upon capture of a card as a cardzi, the invention prompts the user to share the cardzi, view the cardzi, sync with the cloud or other storage when enabled, or return to the feed 50. For the sharing of a cardzi, the application prompts a user to invite friends, 53, 80 to use the invention, select friends previously associated with the user and the invention through a check box prompt, or utilize a share prompt from social media. Such share prompts include Facebook®, Instagram®, Twitter®, or a typical operating system share prompt. Such share prompts include iOS prompt, iMessage, SMS text, or email using native operating system prompting. Following a user's sharing activity, the share function exits and returns the feed for display to the user.

Figure 3:
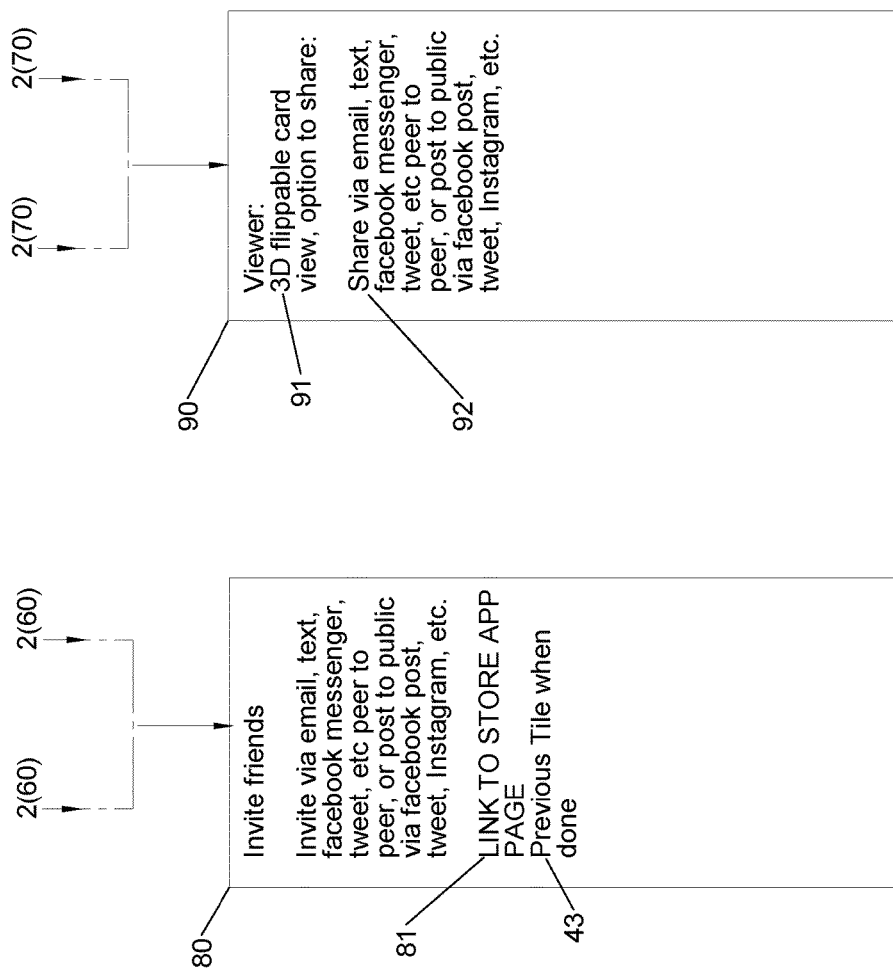

Following capture of a cardzi, a user may want to see the cardzi through a viewer 90 in FIG. 3. The viewer function provides a three dimensional representation of a cardzi 91. A user then swipes a finger upon his portable electronic device, swiping left and right to flip through cardzi pages and the four photographs of each cardzi, swiping up and down to advance, or flip 61, through a collection of cardzis. When operating the viewer in the library function as at 73, a user advancing changes cardzis associated with a user only when a user cycles through all of the cardzis of the user. This appears similar to a user advancing up and down cycles, as at 61, through all the cardzis in a feed. A user swiping left on a front image exits back to the feed. Then a user swiping right on a back image returns to the feed. A button, or share button, in the bottom corner of a display of the invention allows a user to share an image for that cardzi through the share prompts as at 63 of social media as described above, as at 92. In an alternate embodiment, the application includes a back button that returns a user to the feed, to the library, or to the immediate past screen of a user.

The log in screen as at 40 displays the user's profile 25 with a button to edit it. Upon selecting that button, the invention takes a user to the profile information screen 41 where the user may make the desired changes.

The library 60, operates and appears similar to the feed 50 but without the user's profile picture and messages. The library only shows cards of a user and the time and date of the card, associated birthday and holiday, and a share button for direct sharing, as at 63, without automatically viewing of a card. If a user clicks display share image, the invention then displays a cardzi in the viewer 73, 90.

The present invention provides for advertising as a funding mechanism. The invention permits advertisements to appear between frames, especially upon a user exiting the viewer or when ten frames have passed across the screen of user's device. The invention will display ads for the more frequent of the previous two criteria.

The present invention allows a user to capture images of five cards and make them into cardzis. For a one dollar purchase through the invention, the invention presents a user with unlimited image captures and the option to back up cardzis upon cloud storage. The back up stores the combined share .png files, similar to that done upon Facebook®, Twitter®, and the like. For a one dollar purchase in the invention, a user may edit cardzis, add personal notes as at 52, filters, captions, thought bubbles, stickers, and the like. The invention does not allow a user to buy out of advertisements, thus the invention will always have advertisements on display. The invention tastefully locates the advertisements to minimize intrusion upon the user experience.

The present invention foresees creation of additional frames to meet the needs and suggestions of the users. The present invention produces its screens as fully layered .psd files though the invention will adapt to future file formats as they come along in the software industry. The present invention will also utilize the gyroscopic function of the user's device to orient its displays as a user tilts or otherwise moves the user's device, particularly in the capture and viewer modes.

The advertisements of Cardzi have the form and appearance of full page video, game, or smart phone application advertisements run as video or screen shots on a timer. The Cardzi will display a cross or an X to exit after a set time based on the advertising contract. These will display after the viewer frame or after ten consecutive frames without an app shown, whichever occurs more frequently by a user.

When a user makes a purchase within the Cardzi invention, a user has a limit of capturing five cards, and the Cardzi has no cloud storage interaction as its default setting. A $1.00 (USD) in app purchase unlocks unlimited captures, and cloud storage backup for all cards attached to a user's account. Cloud storage backup, through the invention, will store all four images to a cloud service of the user's choice and generate a folder "MyCardzi." The Library then synchronizes with the cloud service by downloading all cards in the MyCardzi folder and uploads to the folder all cards that are not present.

The invention has another $1.00 (USD) in app purchase that applies filters to captured cards, adds personal notes, and provides other image editing features that a user may select based upon his budget and time constraints.

The Applicant also foresees its Cardzi advertising as including purchasing by users of cards that users may share. Such purchasing feature will include reminders to each user of holidays, birthdays, Christmas, and the like appropriate for each user and providing a link to purchase card sites. The advertising may also include Facebook® ads on a facebook page, Twitter® ads on a twitter page, and Instagram® ads on Instagram page. The advertising of the invention may also include social media platforms such as Pinterest®/Pin a card, Pin a hand written note in a card, and cards can go viral. The advertising of the invention may also include video such as YouTube® where a three dimensional rendering of a card appears flipped through in video form instead of share.png. The advertising of the invention may also include Snapchat® where a user snaps cards, then the present invention streams a feed of a user's snapped cards during holidays on the user's Snapchat® account as events.

The invention also has the feature so that a user may sign Cardzi virtually. The virtual signature begins with a blank captured card, where for a dollar, a user can write a note and sign a blank sheet of paper, the user takes a photo of the message and signature, and then Cardzi superimposes the note and signature on E-cards. The E-cards have the form of captured blank cards with permission of the designer or supplier and an ad deal with card and e-card companies. An E-card with a Cardzi note and signature then provides the user the ability to send them to friends on holidays and birthdays in the application of the invention, and flipped through in the viewer. This signed card provides the impression to the receiving user of personalization, the real look from captured cards will increase the value versus e-cards which appear to internet images of lesser value. The hand written notes and signatures superimposed on an image of a real card image make the annotated card authentic to the receiving user.

In a further alternate embodiment, the present invention integrates into a paper printer. The present invention has cooperates with hardware for printers with a tray that accepts scored card stock and that prints to both sides with no human interaction of flipping paper. This embodiment will use a dedicated tray that only holds this card stock: scored to fold in half, stored open and flat. Cardzi enabled printers print cards anywhere in the world. The present invention will charge a licensing fee to use Cardzi paper and Cardzi printers to manufacturers among other things. The present invention allows a user purchase any card available and have it printed at any Cardzi enabled printer presently online. The present invention charges a few dollars per card and then distributes 10% of revenue to Cardzi and 90% to card companies. This embodiment also has a feature to recognize shared cards, with ability for a user to choose, buy, and print cards as they are shared. Users viewing cards on Facebook® will click "buy this card" with an option to have the card mailed to them for the cost of the card plus shipping from card the company. From this transaction, Cardzi received compensation such as $0.15 per card for advertising. Further, when a printer has Cardzi hardware, the printer will display an option to print the card. The present invention once more reminds users on holidays and their friend's birthdays to not forget a card! The present invention then offers its user the ability to sign and print a card at the user's location, such as the house of the person's birthday, birthday party, office, and the link, from anywhere in the world. In short, have smartphone, have a card.

The present invention effectively operates as a system with a method for displaying images of cards. That method has these steps: displaying a load screen, presenting a bottom menu, operating a tutorial function, presenting a log-in and registration screen where the registration screen collects data from users, at least two of them, updating a feed, maintaining a library of the images, capturing at least one image of a card, inviting a user or group of them to view images of another user, and operating a viewer displaying at least one image of a card. The presenting a bottom menu step directs a user to the operating a tutorial, capturing at least one image of a card, maintaining a library, and updating a feed. Meanwhile, the presenting a log in and registration screen step organizes the data from at least two users into at least two profiles wherein each profile is associated to each users. The presenting a log in and registration screen step requires each of users to enter that screen upon his first use of the invention and then later when a user returns to the invention as a start screen.

The updating a feed step has these components: sharing of images, organizing of images, and searching of images, and storing and displaying textual comments provided by users for each image. The preceding system of a method operates upon non-transitory computer readable media as a set of computer readable instructions.

Moreover, the invention seeks to solve the problem of aggregating images of a planar article, or card, into foursomes, where the card has an obverse face showing a typical card front and an opposite reverse face showing the inside message of a card. The solution to that problem has these steps in its method: capturing at least one image of the obverse face of the card and at least one image of the card's reverse face, dividing the at least one image of the card's obverse face into a pair of a left image and a right image and the at least one image of the card's reverse face also into a pair of a left image and a right image, linking the pair of a left image and a right image of the card's obverse face with the pair of a left image and a right image of the card's reverse face into a foursome representing a card, storing a plurality of the foursomes for retrieval using a viewer upon a user's smart phone or other electronic device. The method has refinements as: capturing a second image upon a background compatible with the right image of the card's reverse face so that the second image appears visible upon the card's reverse face to a user, orienting the right image of the card's reverse face, overlaying the second image upon the right image of the card's reverse face, capturing a third image with the second image upon the right image of the card's reverse face, and transmitting the at least one image of the card's obverse face and the third image to a destination selected by a user, or sharing the image.

From the aforementioned description, a cardzi display system has been described. The cardzi display system is uniquely capable of organizing and retrieving images of cards upon a smart phone from a collection of images called cardzis. The cardzi display system and its various components may be created upon many software platforms, including but not limited to, C++, Dreamweaver, HTML, XML, Web 2.0, and a host of other development languages.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified not to obscure the illustrative embodiments.

Various operations have been described as multiple discrete operations, that is most helpful in understanding the present invention, however, the order of description should not be construed as to imply that these operations are necessarily order dependent. In particular, these operations need not be performed in the order of presentation.

Moreover, in the specification and the following claims, the terms "first," "second," and the like are used merely as labels, and are not intended to impose numerical requirements on their objects.

The above description is intended to be illustrative, and not restrictive. The above-described examples may be used in combination. Other embodiments can be used, by one of ordinary skill in the art upon reviewing the above description. The Abstract is provided to allow the reader to ascertain the nature of the disclosure. Also, in the above Detailed Description, various features may be grouped together to streamline the disclosure. This should not be interpreted as intending that an unclaimed disclosed feature is essential to any claim. Rather, inventive subject matter may lie in less than all features of a disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other methods and systems for carrying out the several purposes of the present invention. Therefore, the claims include such equivalent constructions insofar as they do not depart from the spirit and the scope of the present invention.

I claim:

1. A method of displaying images of cards, comprising:
    displaying a load screen;
    presenting a bottom menu;
    operating a tutorial function;
    presenting a log-in and registration screen, said registration screen collecting data from at least two users;
    updating a feed;
    maintaining a library of the images;
    capturing at least one image of a card;
    inviting at least one user to view images of one other user; and,
    operating a viewer displaying said at least one image of a card.

2. The method of displaying images of cards of claim 1 further comprising:
    said presenting a bottom menu directing a user to said operating a tutorial, said capturing at least one image of a card, said maintaining a library, and, said updating a feed; and,
    said presenting a log in and registration screen organizing said data from said at least two users into at least two profiles wherein each profile is associated to each of said at least two users.

3. The method of displaying images of cards of claim 1 further comprising:
    said presenting a log in and registration screen requiring each of said at least two users to enter said screen upon a first use of said method and to enter said method directly upon later uses of said method.

4. The method of displaying images of cards of claim 1 further comprising:
    said updating a feed including sharing of images, organizing of images, and searching of images, and storing and displaying textual comments provided by said at least two users upon at least one image.

5. A non-transitory computer readable media comprising:
    computer readable instructions for displaying a load screen;
    computer readable instructions for presenting a bottom menu;
    computer readable instructions for operating a tutorial function;
    computer readable instructions for presenting a log-in and registration screen, said registration screen collecting data from at least two users;
    computer readable instructions for updating a feed;
    computer readable instructions for maintaining a library of the images;
    computer readable instructions for capturing at least one image of a card;
    computer readable instructions for inviting at least one user to view images of one other user; and, computer readable instructions for operating a viewer displaying said at least one image of a card.

6. A method of aggregating images of a planar article into foursomes, said planar article being a card having an obverse face and an opposite reverse face, comprising:

- capturing at least one image of said obverse face of said card and at least one image of said reverse face of said card;
- dividing said at least one image of said obverse face of said card into a pair of a left image and a right image and said at least one image of said obverse face of said card into a pair of a left image and a right image;
- linking said pair of a left image and a right image of said obverse face with said pair of a left image and a right image of said reverse face into a foursome representing a card;
- storing a plurality of said foursomes for retrieval using a viewer.

7. The method of aggregating images of a planar article into foursomes of claim 6 further comprising:

- capturing a second image upon a background compatible with said right image of said reverse face of said card wherein said second image appears visible upon said reverse face of said card to a user;
- orienting said right image of said reverse face of said card;
- overlaying said second image upon said right image of said reverse face of said card;
- capturing a third image consisting of said second image upon said right image of said reverse face of said card; and,
- transmitting said at least one image of said obverse face of said card and said third image to a destination selected by said user.

* * * * *